United States Patent [19]

Jantzen

[11] Patent Number: 5,413,973
[45] Date of Patent: May 9, 1995

[54] METHOD FOR THERMAL PROCESSING ALUMINA-ENRICHED SPINEL SINGLE CRYSTALS

[75] Inventor: Carol M. Jantzen, Aiken, S.C.

[73] Assignee: The United States of America as represented by the United States Department of Energy, Washington, D.C.

[21] Appl. No.: 190,940

[22] Filed: Feb. 3, 1994

Related U.S. Application Data

[63] Continuation of Ser. No. 100,219, Aug. 2, 1993, abandoned, which is a continuation of Ser. No. 957,957, Oct. 8, 1992, abandoned, which is a continuation of Ser. No. 793,504, Nov. 15, 1991, abandoned, which is a continuation of Ser. No. 363,020, Jun. 8, 1989, abandoned.

[51] Int. Cl.$^6$ ............................................. C04B 35/10
[52] U.S. Cl. ..................................... 501/120; 501/153
[58] Field of Search ....... 156/603, DIG. 61, DIG. 73, 156/DIG. 78; 501/120, 153

[56] References Cited

U.S. PATENT DOCUMENTS

| | | | |
|---|---|---|---|
| 3,531,308 | 9/1970 | Bagley | 501/120 |
| 3,990,902 | 11/1976 | Nishizawa et al. | 501/153 |
| 4,543,346 | 9/1985 | Matsui et al. | 501/120 |
| 4,584,157 | 4/1986 | Matsui et al. | 501/120 |

FOREIGN PATENT DOCUMENTS 1136953  1/1957  France .

OTHER PUBLICATIONS

W. F. Eppler, "Uber das Hartem Sgnlhetischer Spinelle", Angew. Mineral 4:345–362, 1943.
M. H. Barnes, "Synthetic Sapphire and Spinel Reduction in Germany", Tech. Rept. F.I.A.T. 655: pp. 1–17, 1945.
J. G. Grabmeier et al., "Strength of Flame–Fusion—Grown Magnesium–Aluminum Spinel", J. Am. Ceram. Soc. 52:645–650, 1969.
C. C. Wang, "Growth and Characterization of Spinel Single Crystals for Substrate Use in Integrated Electronics" J. Appl. Physics 40:3433–3444, 1969.
P. F. Becher, "Press–Forged Al$_2$O$_3$–Rich Spinel Crystals for IR Applications", Am. Ceram. Soc. Bull. 56:1015–1017, 1977.
H. Saalfeld et al., "Die Entmischung Al$_2$O$_3$–Oberscattigter Mg-Al Spinelle", Z Kristallgor. 109:87–109, 1957.
M. H. Lewis, "Precipitation in Nonstoichiometric Spinel Crystals", Phil. Mag. 20:985–998, 1969.
"Magnesium Aluminate Spinel", Phil. Mag. 29:709–722, 1974.
W. F. Eppler, "Bearing Jewels of Hardened Synthetic Spinel", F.I.A.T. Final Report #1038, pp. 1–40, 1947.
A. Mangin et al., Abstract of: Cont. Rend. 242:1893–1895, 1956 (Chem. Abst. vol. 50, #11757H, (1956).
A. Lejus et al., "Formation of a Metastable Intermediate Phase During the Decomposition of a Nonstoichiometric Spinel", Cont. Rend. 251:959–961, 1960 French Original and English abstract (Chem. Abstr. vol. 55, #21483B (1960).

(List continued on next page.)

Primary Examiner—Karl Group
Attorney, Agent, or Firm—Brian R. Tumm; Harold M. Dixon; William R. Moser

[57] ABSTRACT

A process for age-hardening alumina-rich magnesium aluminum spinel to obtain the desired combination of characteristics of hardness, clarity, flexural strength and toughness comprises selection of the time-temperature pair for isothermal heating followed by quenching. The time-temperature pair is selected from the region wherein the precipitate groups have the characteristics sought. The single crystal spinel is isothermally heated and will, if heated long enough pass from its single phase through two pre-precipitates and two metastable precipitates to a stable secondary phase precipitate within the spinel matrix. Quenching is done slowly at first to avoid thermal shock, then rapidly.

15 Claims, 6 Drawing Sheets

OTHER PUBLICATIONS

D. Lewis et al., "Precipitation and Toughness in Aluminum-Rich Spinel Single Crystals", Fracture Mechanics of Ceramics, vol. 8, Plenum Press, N.Y., pp. 61–68 (in press) no date.

Y. Akimune et al. "Knoop Microhardness Anisotropy of Single-Crystal Stoichiometric $MgAl_2O_4$ Spinel", J. Am. Ceram. Soc. 70:C84–C86 1987 no month.

Donlon et al., "Precipitation in Non-Stoichiometric Spinel", J. Of Mat. Sci. 17 (1982) pp. 1389–1397.

Bansal et al., "Precipitation Strengthing In Non-Stoichiometric Mg-Al Spinel", Fracture Mechanics of Ceramics, vol. 2, pp. 677–690 (1974).

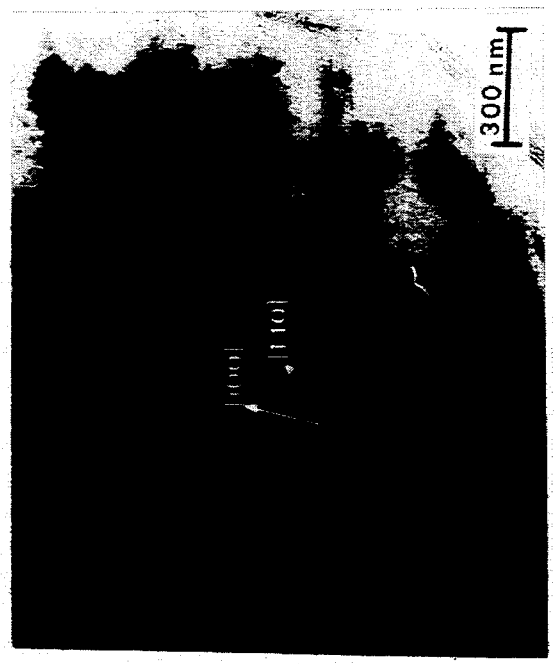
FIG. 4
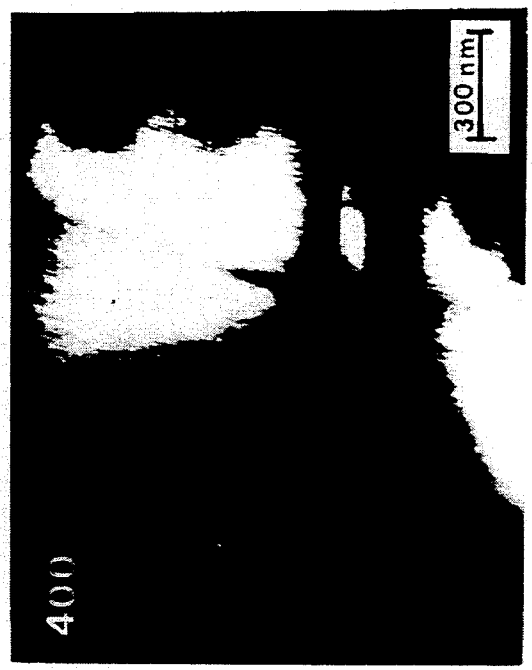
FIG. 2
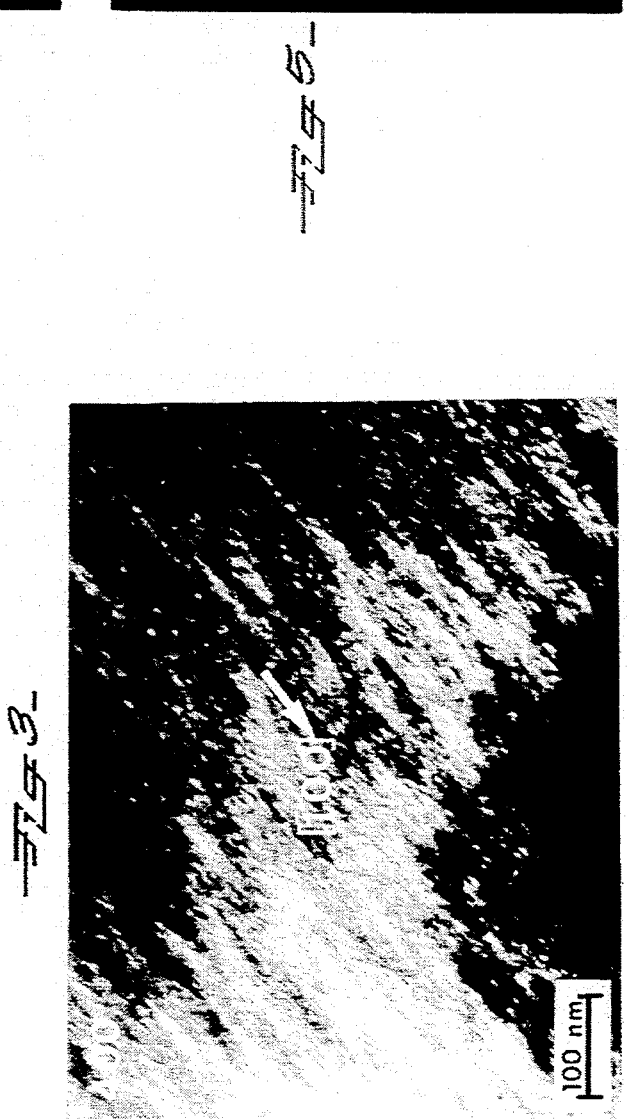
FIG. 3

LEGEND

○ BANSAL AND HEUER
● LEWIS et al

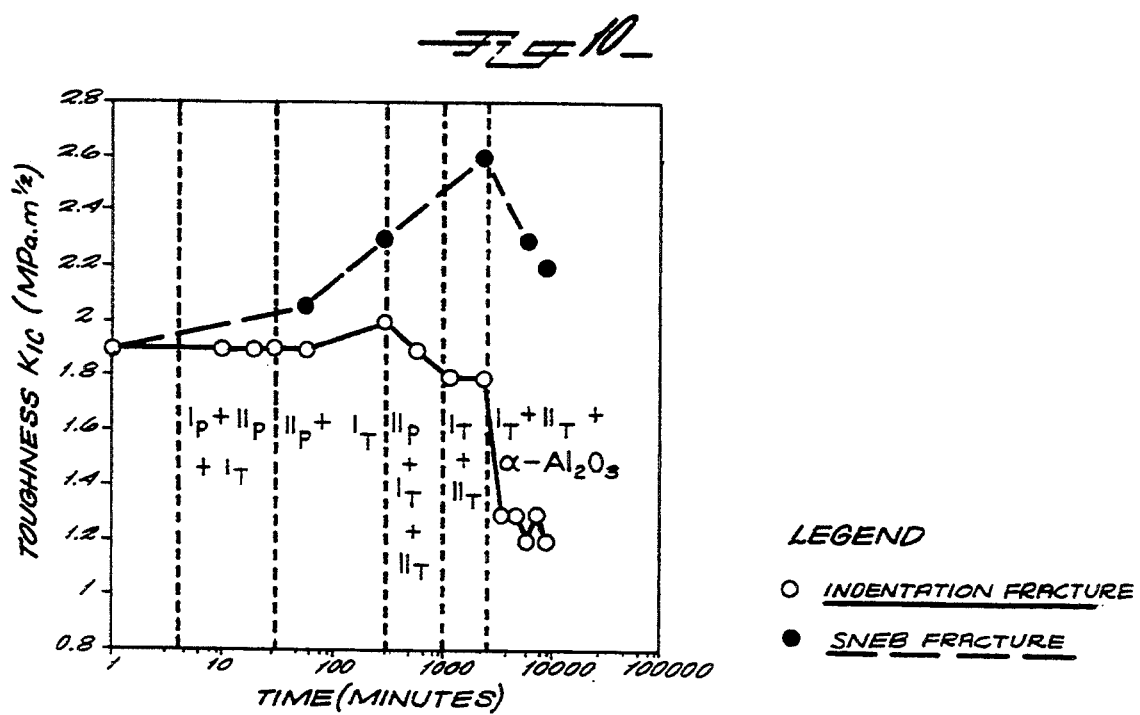

METHOD FOR THERMAL PROCESSING ALUMINA-ENRICHED SPINEL SINGLE CRYSTALS

The United States Government has rights in this invention pursuant to Contract No. DE-AC09-76SR00001 between the U.S. Department of Energy and the E. I. DuPont de Nemours & Co.

This application is a continuation of Ser. No. 08/100,219, filed Aug. 2, 1993, now abandoned, which is a continuation of Ser. No. 07/957,957, filed Oct. 8, 1992, now abandoned, which is a continuation application of Ser. No. 07/793,504, filed Nov. 15, 1991, now abandoned, which is a continuation application of Ser. No. 07/363,020, filed Jun. 8, 1989, now abandoned.

BACKGROUND OF THE INVENTION

1. Field of the Invention and Contract Statement

The invention relates to a method for thermally processing alumina-enriched spinel single crystals to obtain desired physical characteristics.

2. Discussion of Background

The physical characteristics—hardness, clarity, flexural strength, toughness—of magnesium aluminum spinels change significantly during thermal processing. These characteristics change at different rates and to different extents depending on the length of time and the temperature at which the thermal processing takes place.

By melting spinel compositions and then adding excess alumina, a single phase, supersaturated, solid solution of aluminum-enriched magnesium spinel can be formed ranging in composition from $MgO:1\ Al_2O_3$ to $MgO:3.5\ Al_2O_3$. The single phase can be retained by rapid quenching to a room temperature where decomposition occurs. Subsequent thermal processing may result in precipitation of second phases depending on the processing temperature and time.

During thermal processing, as second phase crystals precipitate in the spinel matrix, matrix properties are transformed from those of the single phase material. For example, these second phase precipitates improve the hardness of the crystal by a mechanism known as age-hardening or transformation toughening. For high temperature structural and high strength optical applications, phase transformation-toughened crystals have great potential.

However, some of the physical characteristics of the spinel matrix do not improve with age-hardening; some change at different rates if age-hardening takes place at higher temperatures. The paths to desired physical characteristics wrought by age-hardening of alumina-enriched spinel crystals have not been obvious to previous researchers.

Phase transformed $MgO:3.5Al_2O_3$ and its age-hardened properties have been a source of interest for many years. During World War II age-hardened $MgO:3.5Al_2O_3$ was studied as a replacement for sapphire jewel bearings in instrumentation. In the 1960's, $MgO:3.3Al_2O_3$ was considered as a substrate for silicon-integrated electronic devices. More recently, $MgO:3.1Al_2O_3$ spinel has been tested for use as infrared, guided missile dome material and as electrical insulating material. The physical characteristics required of spinel crystals for these three applications are different.

French patent No. 1,136,953, issued Jan. 7, 1957 discloses e process for hardening magnesium spinels discovered by Forestier and Mengin. Three examples of age-hardened spinel crystals are described in the patent specification but the times end temperatures governing the age-hardening process are not definitively disclosed. The trend indicated by the three examples cited is that shorter times and higher age-hardening temperatures produce harder crystals.

In U.S. Pat. No. 3,990,902, Nishizawa discloses the substitution of magnesium titanate for a portion of magnesium aluminate to accommodate a layer of spinel epitaxially deposited as a substrate on a layer of silicon semiconductor material. The substitution avoids the mismatch that would otherwise occur between the spinel crystal lattice structure and that of silicon.

Others have examined $MgO:x\ Al_2O_3$ (where $x=3.1$ to 3.5) but none has identified the thermal processing paths by which secondary phase transformations take place in alumina enriched spinel single crystals during thermal processing. Once these paths are known, the production of aluminn-enriched spinels with the desired physical characteristics for a wide variety of applications can be controlled and optimized.

BRIEF SUMMARY OF THE INVENTION

It is an object of the present invention to provide a process for manufacturing alumina-enriched spinel crystals having the desired characteristics of hardness, clarity, flexural strength and toughness.

It is a further object of the invention to provide a process for optimizing the manufacturing of alumina-enriched spinel crystals having the desired characteristics of hardness, clarity, flexural strength and toughness.

Other objects and advantages of the invention will be evident to those skilled in the art.

The objects and advantages of the invention are achieved by a process comprising the steps of obtaining a spinel crystal made by the Verneuil method, selecting from a Time-Temperature-Transformation chart the time and temperature required for age-hardening a spinel crystal to obtain the desired characteristics, isothermally heating the spinel crystal, preferably in air, for the required time at the required temperature, cooling the crystal, preferably relatively slowly at first in order to avoid thermal shock and then more rapidly to room temperature.

Reference is now made in detail to the present preferred embodiment of the invention, as illustrated in the accompanying drawings and photomicrographs.

A BRIEF DESCRIPTION OF THE DRAWINGS

The accompanying drawings and photomicrographs, which are incorporated in and form a part of the specification, illustrate the invention and, together with the description, serve to explain the principles of the invention. In the drawings:

FIG. 2 is a photomicrograph showing the $I_p$ phase precipitate species;

FIG. 3 is a photomicrograph showing the $II_p$ phase precipitate species;

FIG. 4 is a photomicrograph showing the $I_t$ phase precipitate species;

FIG. 5 is a photomicrograph showing the coexistence of the $I_t$ and the $II_p$ phase precipitate species;

FIG. 10 is a graph of fracture toughness versus age-hardening time.

DETAILED DESCRIPTION OF THE INVENTION

Five phase transformations take place in alumina-enriched, magnesium spinel: two metastable pre-precipitates, two metastable intermediate precipitates, and the equilibrium alpha-$Al_2O_3$ precipitate. These five phases appear in six sequential stages having combinations of precipitate species, or populations, beginning with the precipitation of a cubic close packed single phase spinel crystal, supersaturated with alumina, and ending with the the precipitation of alpha-$Al_2O_3$, a face-centered hexagonal close packed crystal within the spinel matrix.

Each of the six combinations is characterized by a distinct precipitate population composed of two or three precipitate species in the spinel matrix. The two early pre-precipitate species are referred to as "$I_p$" and "$II_p$". These are followed by two intermediate, monoclinic transition precipitates referred to as "$I_t$" and "$II_t$". The final species to precipitate is alpha-$Al_2O_3$. As a more stable precipitation species appears, it causes the reversion or dissolution of its immediate precursor, thus following Hardy's Law.

In the first of the six erases, the two early transient precipitate species, $I_p$ and $II_p$ form at low temperatures and short aging times. These precipitates are very small, on the order of a few nanometers. As aging time is increased, these are joined in the second phase by the intermediate, monoclinic transition phase denoted $I_t$. The presence of $I_t$ causes the dissolution of $I_p$. Thus, the third stage finds only the $II_p$ and $I_t$ species in the precipitate population of the spinel matrix.

The second, intermediate, monoclinic transition phase species, $II_t$, appears in stage four. $II_t$'s presence causes the dissolution of $II_p$ leaving $I_t$ and $II_t$ in stage five. The final transformation boundary is crossed when stable alpha-$Al_2O_3$ forms, joining $I_t$ and $II_t$.

These changes from one metastable precipitate population to another are a sequential process of crystallizations and reversions of precipitate populations. The transitions from one stage to another are gradual until the formation of stable alpha-$Al_2O_3$ in stage six. Then the physical characteristics of the spinel matrix change rapidly.

Figure 1:
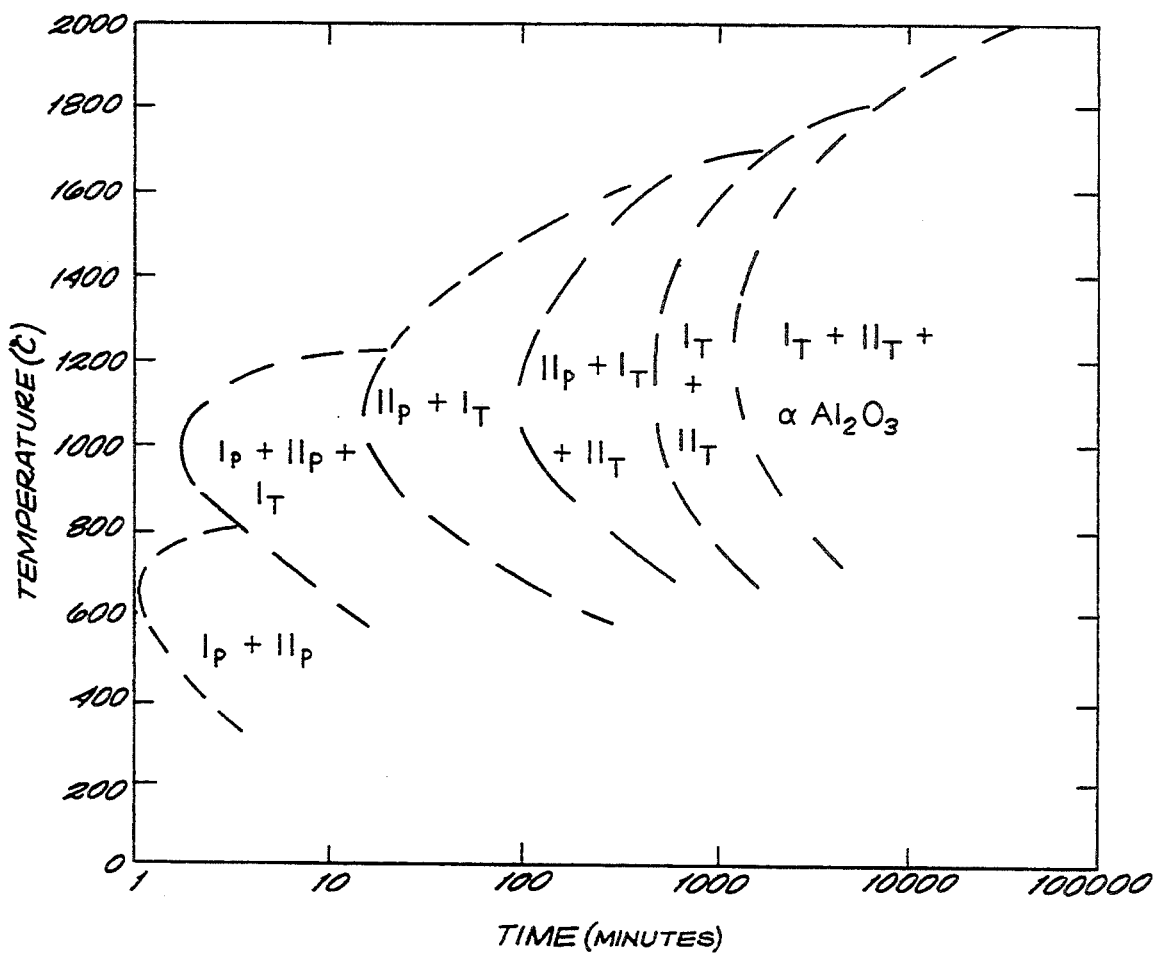
FIG. 1 is a Time-Temperature-Transition Chart for $MgO:3.5Al_2O_3$.

A time-temperature-transition chart can be constructed from data of the types of precipitates present in various pairings of temperature and aging times as shown in FIG. 1. It has been found that the data form a series of six "C" shaped curves, each curve defining the boundary of a region between each stage and precipitate population in that region. The "nose" of the curve represents the maximization of the growth rate of crystallization.

At the nose of the curve in the leftmost end of each region, the two opposing time-temperature dependencies, the crystallization driving force versus molecular mobility, are equivalent in their influence and the rate of crystallization is optimized. The crystallization driving force determines the upper part of the "C" curve and molecular mobility determines the lower part of the curve.

Above, below and to the left of these "C" curves, no precipitation takes place. To the right, the longest aging times result in greater amounts of the stable alpha-$Al_2O_3$ crystals being formed. Crystals formed at lower temperatures are very small, on the order of a few nanometers; crystals formed at higher temperatures and longer time durations are larger.

Photomicrographs show the development of secondary phase precipitates. Referring to FIG. 2, the $I_p$ species of the stage one population is observable as extremely small elliptical precipitates with elongated axes aligned at about 18 degrees to the [001] or [010] crystallographic direction of the spinel matrix under dark-field electron microscopy. The appearance of the $I_p$ precipitation species in phase one begins the formation of aluminum-enriched precipitates.

$II_p$ is shown in FIG. 3. The growth of the $II_p$ phase appears as parallel rows of elongated precipitates aligned parallel to the [001] or [100] crystallographic direction of the spinel matrix under dark-field electron microscopy.

In FIG. 4, the first needle shaped transition phase, $I_t$, is observed in bright field electron microscopy. This precipitate species forms an angle of 73 degrees with the [100] crystallographic direction of the spinel matrix.

In FIG. 5 the coexistence of the needle shaped $I_t$ and the small $II_p$ precipitates aligned parallel to [100] are visible in dark-field electron microscopy.

Figure 6A:
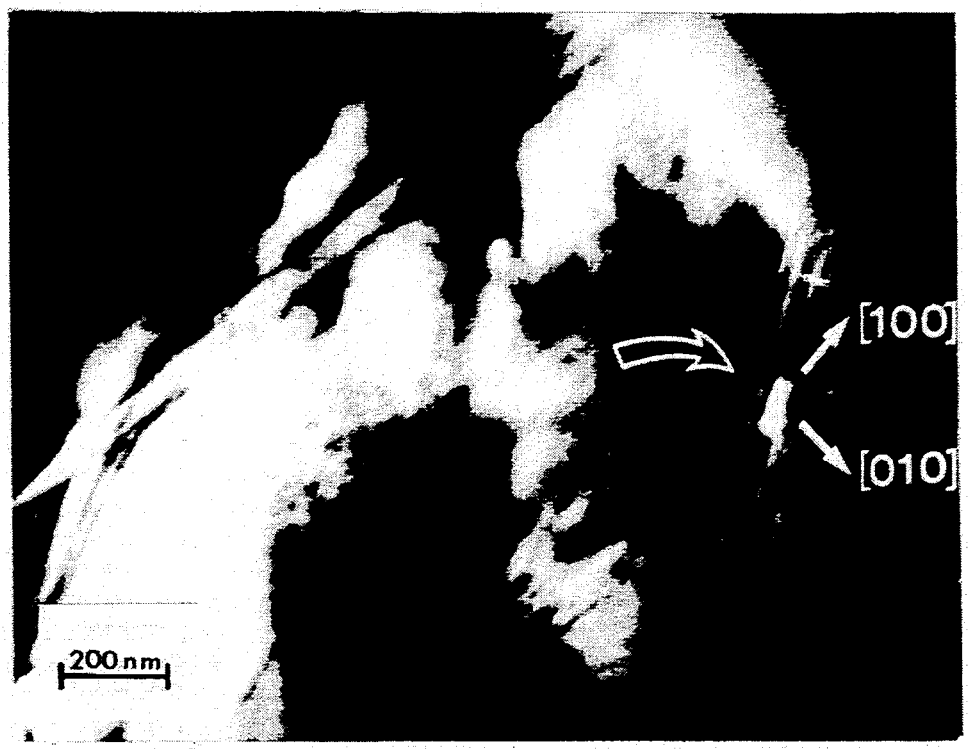
FIGS. 6a and 6b are photomicrographs showing the $I_t$ phase precipitate species in a different orientation than shown in FIG. 4.
Figure 6B:
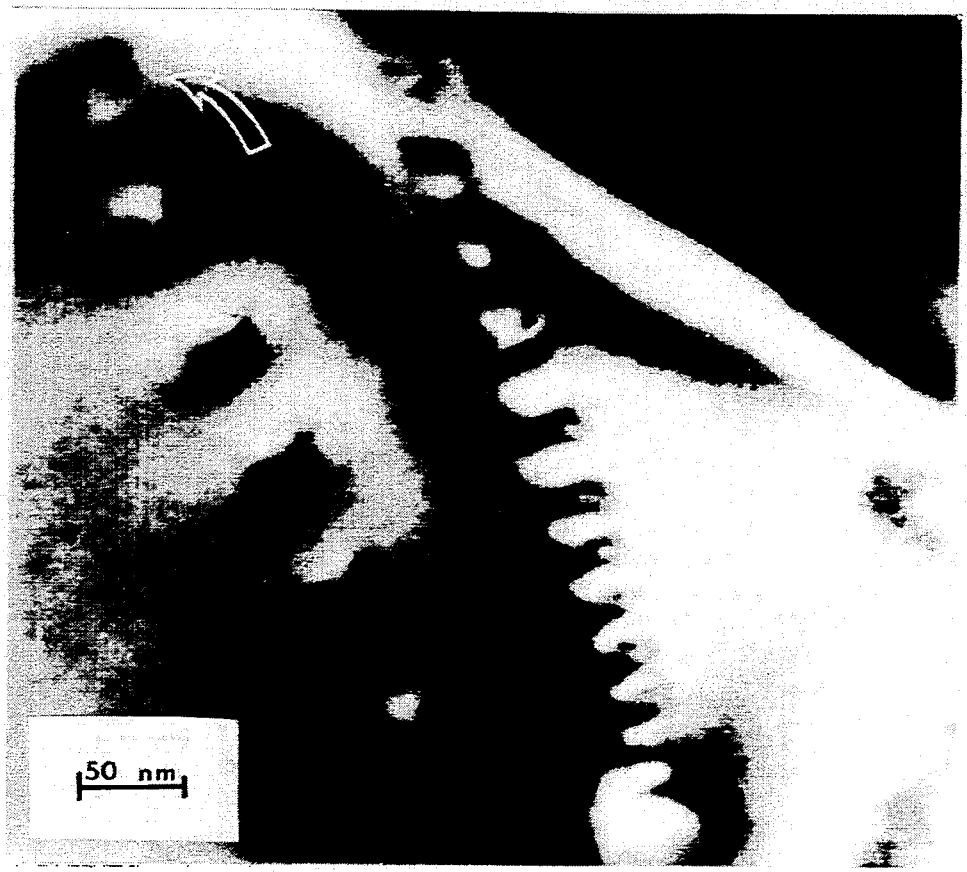

FIGS. 6a and 6b show the needle shaped $I_t$ precipitates in cross section. FIG. 6a shows the $I_t$ precipitates exhibiting fringe contrast while the fringe contrast is absent in the cross section shown in FIG. 6b.

The type $II_t$ precipitates (not shown) are also needle shaped but aligned parallel to the [100] crystallographic direction of the spinel matrix.

Figure 7A:
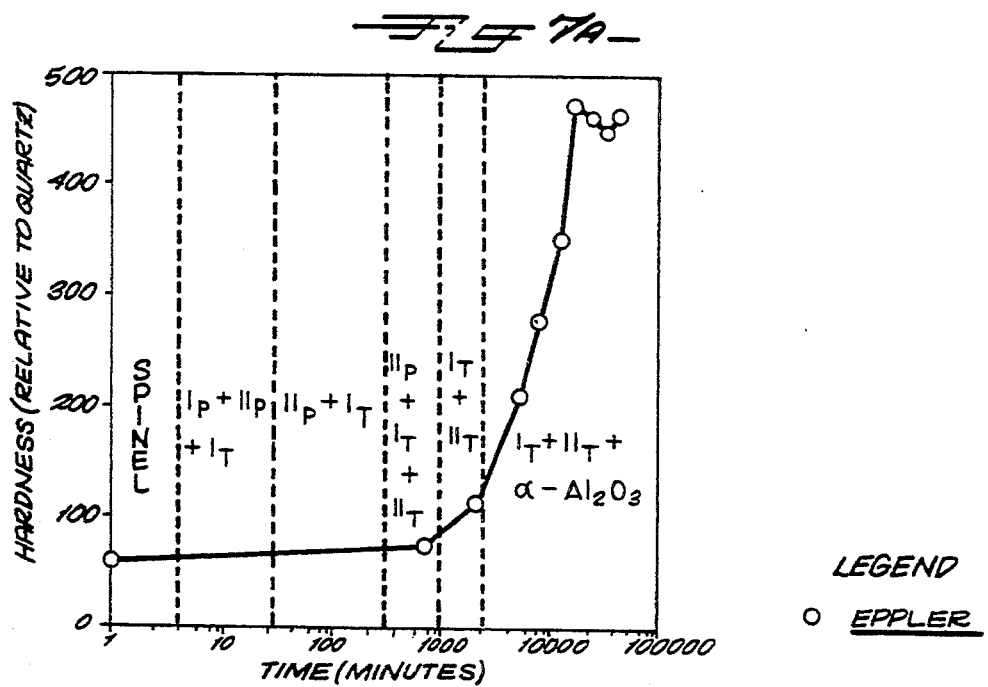
FIGS. 7a and 7b are graphs of hardness versus age-hardening time at a temperature of 850° degrees Celsius.
Figure 7B:
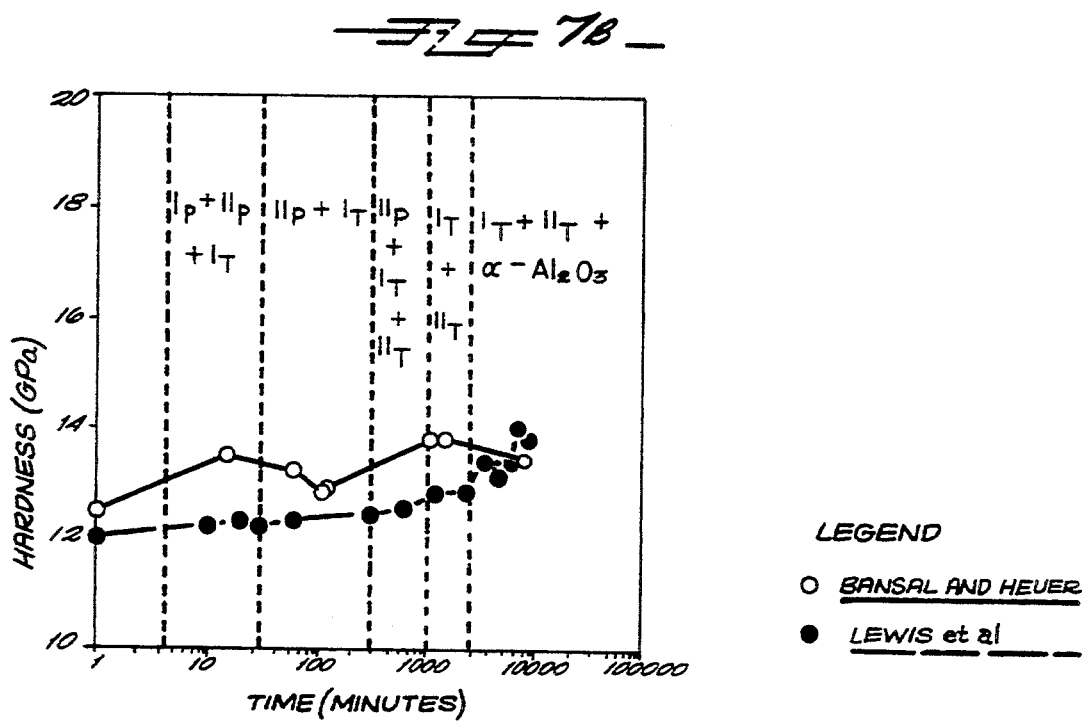
Figure 8:
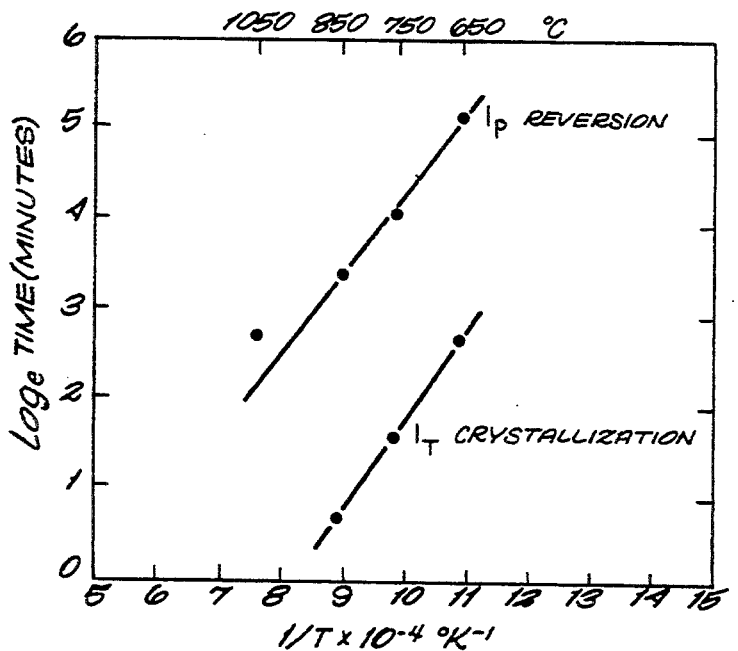
FIG. 8 is a graph of the rate of precipitation and dissolution of the precipitate species.
Figure 9:
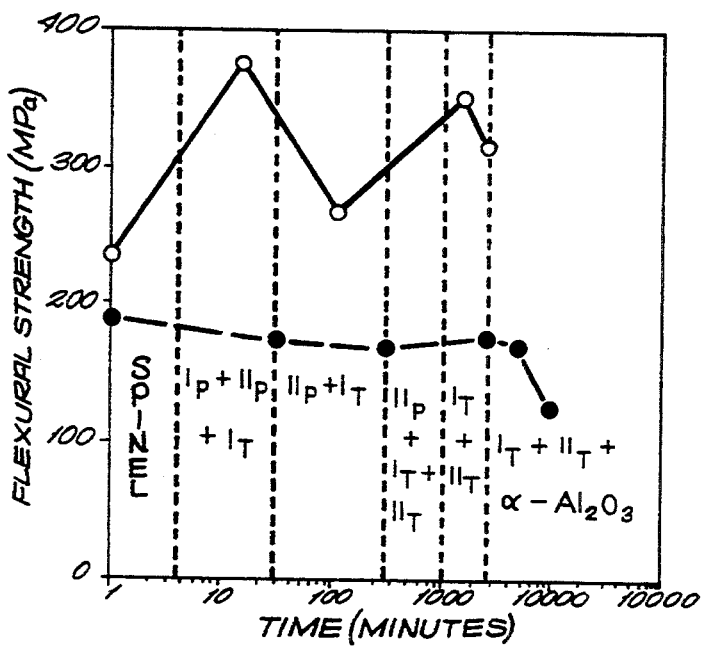
FIG. 9 is a graph of flexural strength versus age-hardening time.

The characteristics of spinel crystals of most interest include hardness, clarity, flexural strength, toughness. The behavior of hardness, flexural strength and toughness as a function of aging time are shown in FIGS. 7, 9, and 10, respectively. Although hardness increases with time, flexural strength and toughness generally decrease, especially in the sixth stage. Clarity decreases with increasing size or number of precipitates; higher temperatures and longer aging times produce precipitates of larger size such as $I_t$ and $II_t$ as indicated by FIG. 8.

The process of producing age-hardened, alumina-enriched spinel crystals begins with a single phase crystal made by the Verneuil method, such as provided by Hrand Djevahirdjian, Ltd. of Monthey, Switzerland. In the Verneuil method, aluminum oxide and magnesium oxide are fused at high temperature, $Al_2O_3$ is added, then the crystal is carefully flame fused and quenched.

Age-hardening is best done isothermally, preferably in a vertical tube furnace with the fabricated spinel suspended in a sample holder such as a basket or wire made of an inert material such as platinum.

At the point when the crystal has been heated in air at the appropriate temperature for the appropriate length of time, the sample holder is released and the crystal placed on a soft insulating but flame retardant material such as fiberglass which will provide an initial slow cooling. Subsequently, the sample is cooled rapidly.

Cooling the age-hardened crystal must be done as rapidly as possible without causing thermal shock. The first few hundred degrees of cooling are the most important. After initial cooling, more rapid cooling can take place, such as on a cold, insulated brick. The rate of cooling should be no slower than $10^{-1}$ degrees Celsius per second but no faster than $10^{+1}$ degrees per second.

Three examples of this process follow:

EXAMPLE 1

For jewel bearings fabricated of $MgO:3.5Al_2O_3$ made by the Verneuil method of single phase crystal formulation, machined bearings of <100> or <111> single crystals can be age-hardened in an air atmosphere furnace at any combination of time and temperature that induces crystallization of the $II_p + I_t + II_t$ population, preferably a temperature of 1050 to 1150 degrees for 150 to 1000 minutes, and then air-quenched at a rate of at least $10^{-1}$, but not faster than $10^{+1}$, degrees Celsius per second.

EXAMPLE 2

For making an epitaxial silicon chip substrate, a single phase $MgO:3.5Al_2O_3$ spinel crystal, or preferably a $MgO:3.3\ Al_2O_3$ spinel crystal, made by the Verneuil process, preferably having a <100> growth axis, is mounted on a steel block oriented using Laue photography and cut into parallel wafers 20 mils thick, plus or minus ½ degree, along the <100> axis. Lapp the wafer surface smooth beginning with 30 micron boron carbide abrasives and progressing to finer alumina abrasives down to 0.3 microns. Verify the wafer surface is flat to 0.4 microns per centimeter by interferometry, clean, then heat treat at one of the following temperature-time conditions to avoid precipitate formation: approximately 1200 degrees Celsius for up to 20 minutes, or 1300 degrees for not more than 60 minutes, or 1400 degrees for not more than 90 minutes, or 1500 degrees for not more than 120 minutes. Then quench at the rate given in Example 1 and bond to a silicon substrate.

EXAMPLE 3

For infrared guided missile dome applications, where clarity is important, a $MgO:3.1\ Al_2O_3$, Verneuil method, spinel crystal, machined into a cylindrical shape and press forged, is age-hardened at any time and temperature, preferably 600 to 800 degrees Celsius for 5 to 10 minutes, which forms $I_p$ and $II_p$ precipitates. These 100 Angstrom precipitates do not interfere with the infrared transmissions of the dome. The crystal is then quenched as in Examples 1 and 2.

The foregoing description of preferred embodiments of an invention has been presented for purposes of illustration and description. It is not intended to be exhaustive or to limit the invention to the precise form disclosed, and obviously, many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A process for age hardening alumina-enriched spinel crystals from a single phase, alumina-enriched spinel crystal comprising the steps of:
   employing a temperature and time transformation combination in which the temperature and time are selected so as to produce a transformation of alumina enriched magnesium spinel containing at least one of the species $I_p$ and $II_p$, in which:
   said $I_p$ species is defined as elliptical pre-precipitates with elongated axes aligned at about 18 degrees to the (001) or (010) crystallographic direction of the spinel matrix under the dark-field electron microscopy;
   said $II_p$ species is defined as parallel rows of elongated pre-precipitates aligned parallel to the (001) or (100) crystallographic direction of the spinel matrix under dark-field microscopy;
   and quenching the spinel crystals containing at least one of the species $I_p$ and $II_p$ so formed.

2. The process of claim 1, wherein said single phase spinel crystal is heated isothermally by suspending said single phase spinel crystal within a vertical tube furnace so that said single phase crystal can be removed by gravity from said furnace.

3. The process of claim 2, wherein said heating takes place in air.

4. The process of claim 1, wherein said quenching takes place it a rate no faster than $10^{+1}$ degrees Celsius per second.

5. The process of claim 1, wherein said quenching takes place at a rate no slower than $10^{-1}$ degrees Celsius per second.

6. The process of claim 1, wherein said quenching takes place at a rate no slower than $10^{-1}$ degrees Celsius per second and no faster than $10^{+1}$ degrees Celsius per second.

7. The process of claim 1, wherein the temperature is controlled to be within the range of 1050 degrees to 1150 degrees Celsius and the time is between 150 and 1000 minutes.

8. The process of claim 7, wherein said quenching takes place at a rate no slower than $10^{-1}$ degrees Celsius per second.

9. The process of claim 7, wherein said quenching takes place at a rate no faster than $10^{+1}$ degrees Celsius per second.

10. The process of claim 1 wherein the quenching is achieved first slowly by placing said spinel crystals on a soft insulating but flame retardant material for a few hundred degrees of cooling, and then cooled faster by placing said spinel crystals on a cold body.

11. The process of claim 1, wherein the temperature is from 600 to 800 degrees Celsius and the time is from 5 to 10 minutes.

12. The process of claim 11, wherein said quenching takes place at a rate no faster than $10^{+1}$ degrees Celsius per second.

13. The process of claim 11 wherein said quenching takes place at a rate no slower than $10^{-1}$ degrees Celsius per second.

14. The process of claim 1, wherein the temperature is from 600 to 800 degrees Celsius and the time is from 5 to 10 minutes; and the spinel crystals so formed are clear for use in infrared guided missile dome applications.

15. The process of claim 1, wherein the temperature is controlled to be within the range of 1050 degrees to 1150 degrees Celsius and the time is between 150 and 1000 minutes, so that the spinel crystals so formed are for use as jeweled bearings.

* * * * *